Dec. 21, 1937.  G. M. CUTLER  2,103,149
CONTROL OF GEARING FOR DRIVING SUPERCHARGERS ON AIRCRAFT ENGINES
Filed Nov. 2, 1936  2 Sheets-Sheet 1
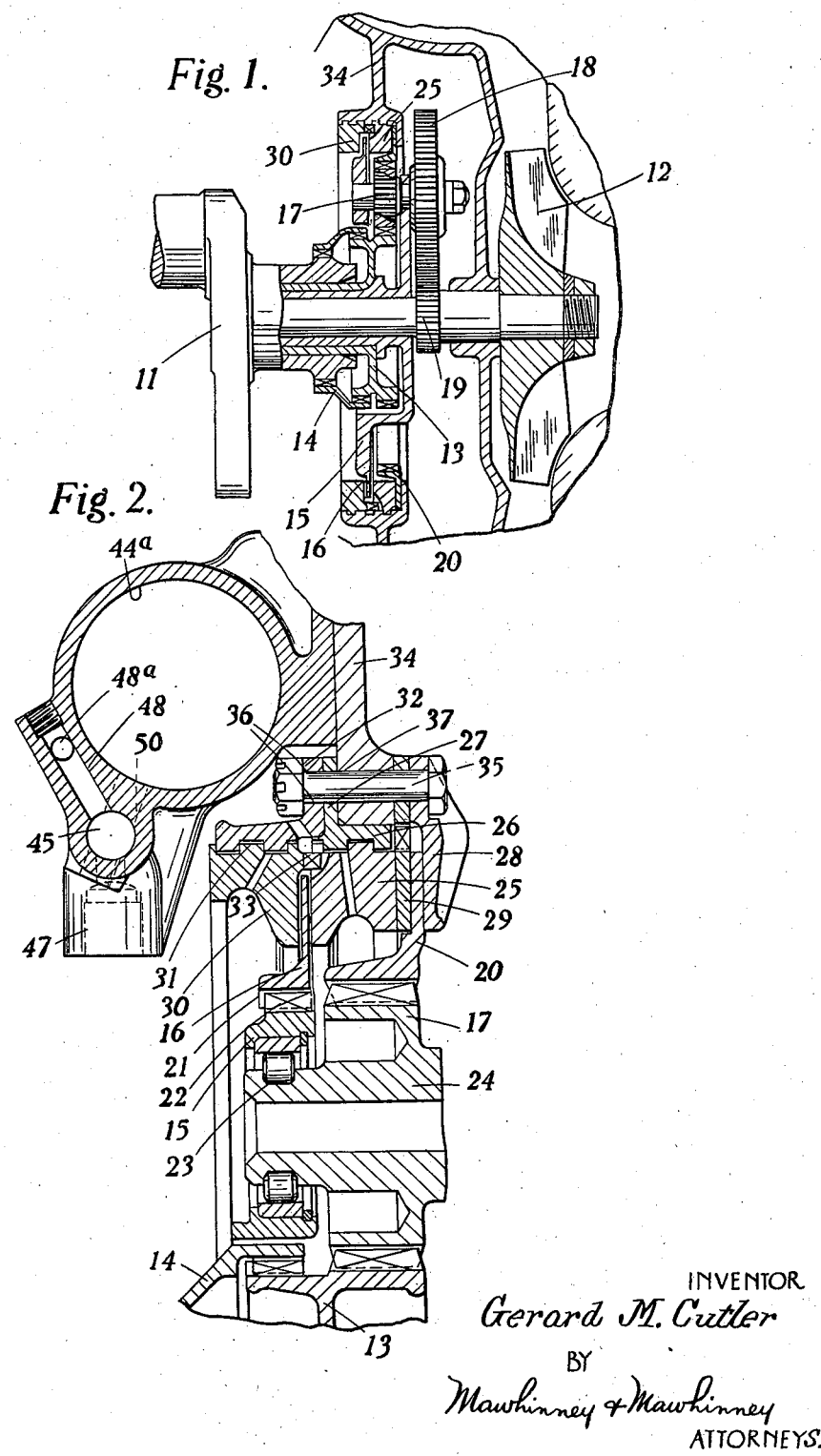
INVENTOR
Gerard M. Cutler
BY
Mawhinney & Mawhinney
ATTORNEYS.

Dec. 21, 1937. G. M. CUTLER 2,103,149
CONTROL OF GEARING FOR DRIVING SUPERCHARGERS ON AIRCRAFT ENGINES
Filed Nov. 2, 1936 2 Sheets-Sheet 2

INVENTOR
Gerard M. Cutler
BY
Mawhinney & Mawhinney
ATTORNEYS.

Patented Dec. 21, 1937

2,103,149

UNITED STATES PATENT OFFICE 2,103,149

CONTROL OF GEARING FOR DRIVING SUPERCHARGERS ON AIRCRAFT ENGINES

Gerard Mervyn Cutler, Coventry, England, assignor to Armstrong Siddeley Motors Limited, Coventry, England Application November 2, 1936, Serial No. 108,867
In Great Britain October 16, 1936

4 Claims. (Cl. 188—152)

This invention relates to change-speed gearing, for use in driving a supercharger of an aircraft engine, of the kind having an element which can be braked or released according to which speed ratio is required.

Gearings of this kind are described in U. S. A. patent specification No. 1,791,393 and British patent specification No. 401,058 (in respect of which Armstrong Siddeley Motors Limited is the patentee), and also in co-pending patent specification No. 108,868. In the latter use is made of two elements each of which can be frictionally braked while the other is released.

One satisfactory form of control through which said element can be braked or released is described in British patent specification No. 350,629 (in respect of which Armstrong Siddeley Motors Limited is the patentee), such control being a hydraulic one providing compactness, on the one hand, and satisfactory mechanical strength on the other.

The invention broadly consists in a control member having a screw-threaded connection with a stationary part and by the rotation of which the said element of the change-speed gearing can be selectively held or released.

As applied to the type of gearing having two elements each of which can be braked while the other is released, the invention further consists in a control member disposed between the two elements and having a screw-threaded connection with a stationary part, such control member being rotatable to effect the braking of either of the elements and at the same time the release of the other.

According to a further feature of the invention, use is made of two control members rotatable in unison and having screw-threaded connections of opposite sense, respectively, with a stationary part, the control members being disposed on opposite sides of the associated element.

The latter, or each of the elements, is preferably in the form of a floating annulus. For adjustment purposes said stationary part may be angularly adjustable with respect to a stationary member.

Whilst the manner in which the control member is to be rotated forms no essential part of the present invention, as such rotation may be satisfactorily effected in many different ways, one very convenient method of effecting this rotation includes the use of a toggle connected between the element and a stationary member, and means for moving the common pivot of the toggle, such means being, if desired, hydraulic means.

In the accompanying drawings:—

Figure 1 is a diagrammatic sectional elevation of one form of two-speed gearing, for driving a supercharger of an internal-combustion engine for an aircraft, fitted with a control mechanism according to the invention, the bearings, lubrication means and other parts of the gearing unnecessary for an understanding of the invention being omitted for the sake of simplicity;

Figure 2 is a fragmentary sectional elevation, to a larger scale, of a constructional example of the same gearing and control mechanism.

Like numerals indicate like parts throughout the drawings.

Figure 3:
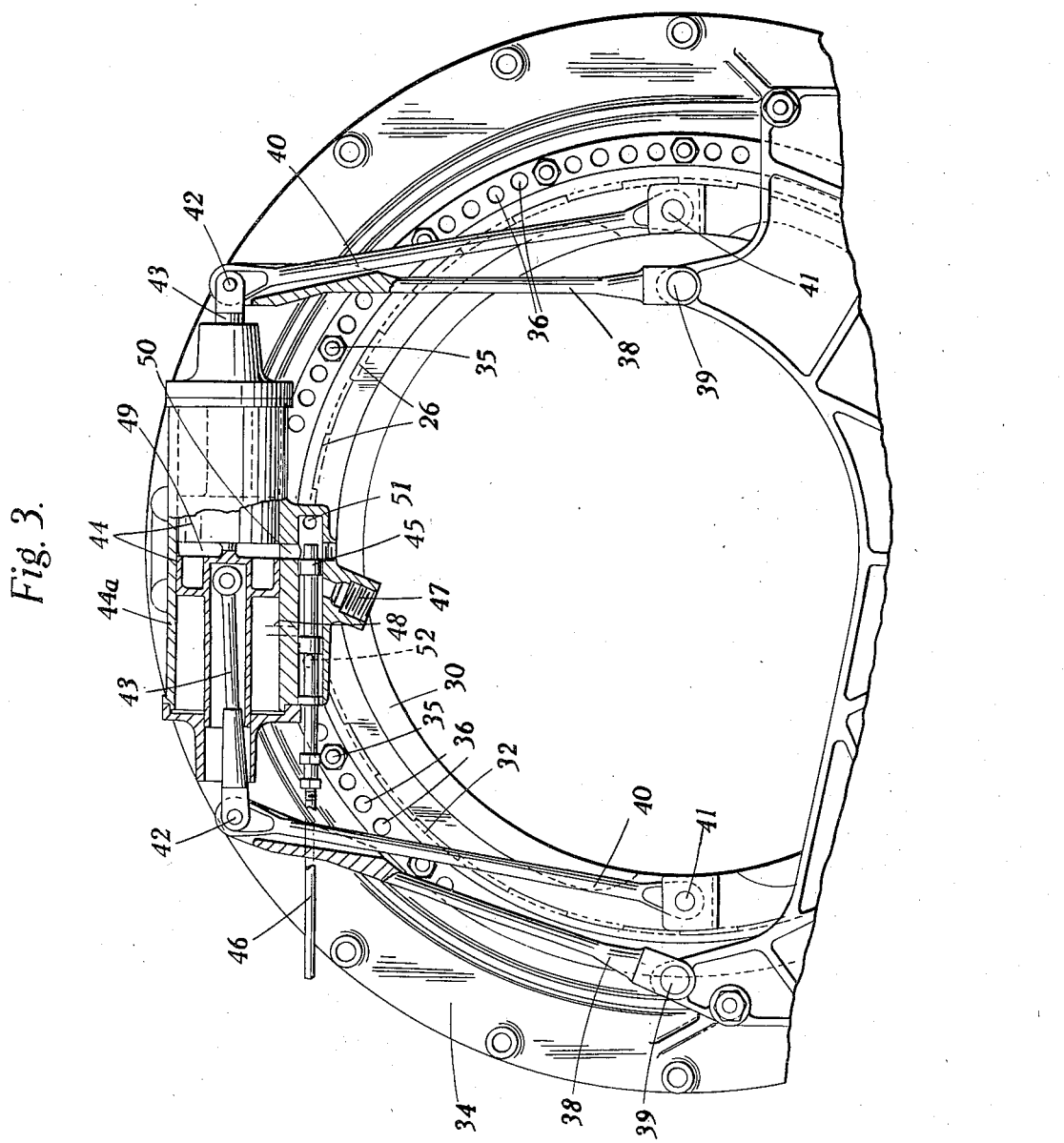
Figure 3 is a fragmentary end elevation of the control mechanism, also to a larger scale than Figure 1.

The drawings show a crankshaft 11 connected to drive the supercharger impellor 12 of an aircraft engine through a two-speed planetary gearing of the kind described in the specification of co-pending patent application No. 108,868. The gearing includes a driving sun wheel 13 with two sets of teeth, one set of which is placed in driving connection with the crankshaft by means of the sleeve 14 formed with two internal rings of teeth. The planet-carrier 15 is formed with a flanged part 16 which can be held or released. The compound planet comprises a small pinion 17 in mesh with the driving sun 13 and a large pinion 18 in mesh with the driven sun 19. The small pinion 17 is also in mesh with a reaction ring 20. In practice the flanged part 16 of the planet-carrier 15, as shown in Figure 2, is preferably a separate annulus formed with an internal ring of teeth 21 in mesh with an external ring of teeth 22 on the planet-carrier. 23 represents a roller bearing part for the hollow shaft 24 of the compound planet.

The control in this instance through which the two different speeds are introduced includes an annular control member 25 having at 26 a screw-threaded connection with a stationary part 27. The screw-threaded connection preferably comprises a multi-start quick thread, for example, one of about twenty starts, such that a relatively small rotational movement of the control member will cause sufficient axial movement thereof for it to engage against the adjacent face of the reaction ring 20 as shown or the adjacent face of the flange 16 according to the direction of the rotational movement.

In the one end position it clamps the reaction ring 20 against the stationary part 28, preferably through an interposed slidably mounted ring 29, to give a planetary drive, and in the other it clamps the flange 16 against the part 30, to give a countershaft drive. The part 30 is in this instance shown as taking the form of an annular control member having at 31 a screw-threaded connection, with the stationary part 32, of equal and opposite sense to that 26 of the control member 25.

33 represents one of a number of axially-extending dogs on the control member 30 engaged in corresponding notches in the control member 25 so that these two rotate in unison. Thus rotation of one of them (for example, of the control member 30) in one direction causes the simultaneous axial movement of the two members towards one another to grip the flange 16, and rotation of the control member 30 in the other direction causes first the separation of the control members to free the flange 16 and then the engagement of the control member 25 with the reaction ring 20. It is thus impossible for both the flange 16 and the reaction ring 20 to be held at the same time.

For adjustment purposes the two stationary parts 27, 32 are adjustably mounted in the stationary member 34, for example, a portion of the casing, by means of the bolts 35 entered through some of a plurality of holes 36 (Figure 3) in the flange of the stationary part 32, and through some of a plurality of holes 37 (Figure 2) in the stationary member 34. The holes 37 do not occupy identical angular positions with the holes 36 in the stationary part; so that by withdrawing the bolts 35 and moving the stationary part 32, angularly a slight amount, certain other of the holes 36 will be brought into alignment with fresh holes 37 in the stationary member whereupon the bolts 35 can be re-inserted therethrough to clamp the parts in an adjusted position.

Whereas any appropriate mechanism may be provided for effecting rotation of the control member 30, the drawings show a pair of toggles each having one link 38 pivotally mounted at 39 on the stationary member and the other link 40 pivotally mounted at 41 on the control member 30, and by movement of the common pivots 42 of the toggles the control member 30 can be rotated. For moving the common pivots the drawings show the pivots as being connected by piston rods 43 to hydraulically-actuated pistons 44 operating in the ends of a cylinder 44a.

In the position of the slide valve 45 shown in Figure 3 (the slide valve being operated by a Bowden or other control 46) fluid under pressure entering at 47 is supplied by way of a port 48 to a passage indicated at 48a (Figure 2) leading to the ends of the cylinder to force the pistons inwardly towards one another whilst the space 49 between the pistons is exhausting through the port 50 and the outlet 51. In the other extreme position of the slide valve 45 the port 50 is in communication with the inlet 47 and the fluid under pressure supplied therethrough forces the pistons outwardly away from one another whilst the cylinder ends exhaust through the passage 48a, the port 48 and the outlet 52.

The construction described and illustrated is one which is very compact, of small weight and of sufficient strength to withstand the stresses imposed upon it. Small adjustments are, of course, unnecessary as the movements of the pistons 44 may vary.

What I claim as my invention and desire to secure by Letters Patent of the United States is:—

1. In a brake for a two-speed planetary gearing for superchargers, an annular frame having an inner ring portion provided with a plurality of circumferentially spaced holes extending axially therethrough, a pair of rings internally threaded in opposite directions and each having a plurality of unevenly spaced holes adapted to register some of the latter holes for each fractional relative rotation of the rings, said latter rings being insertable into said frame and said latter holes adapted for registry with the holes in said frame ring, anchoring means insertable through registering holes to secure the rings together on the frame, a pair of rings externally threaded in opposite directions and adapted to engage with said internally threaded rings, means for securing said externally threaded rings together to rotate in unison and to move toward one another when one ring is rotated in one direction and away from one another when one ring is rotated in the opposite direction, and operating means secured to the said annular frame and to one of said externally threaded rings operable to produce relative rotation therebetween.

2. In a brake for a two-speed planetary gearing for superchargers, an annular frame having an inner ring portion provided with a plurality of circumferentially spaced holes extending axially therethrough, a pair of rings internally threaded in opposite directions and each having a plurality of unevenly spaced holes adapted to register some of the latter holes for each fractional relative rotation of the rings, said latter rings being insertable into said frame and said latter holes adapted for registry with the holes in said frame ring, anchoring means insertable through registering holes to secure the rings together on the frame, a pair of rings externally threaded in opposite directions and adapted to engage with said internally threaded rings, means for securing said externally threaded rings together to rotate in unison and to move toward one another when one ring is rotated in one direction and away from one another when one ring is rotated in the opposite direction, a rod pivotally secured at one end to said annular frame, a second rod pivotally secured at one end to one of said externally threaded rings and being further pivoted at its opposite end to the free end of the first named rod, said rods constituting a toggle, and means on said annular frame for moving the interconnected ends of said rods whereby to move the externally threaded rings relative to the annular frame.

3. In a brake for a two-speed planetary gearing for superchargers, an annular frame having an inner ring portion provided with a plurality of circumferentially spaced holes extending axially therethrough, a pair of rings internally threaded in opposite directions and each having a plurality of unevenly spaced holes adapted to register some of the latter holes for each fractional relative rotation of the rings, said latter rings being insertable into said frame and said latter holes adapted for registry with the holes in said frame ring, anchoring means insertable through registering holes to secure the rings together on the frame, a pair of rings externally threaded in opposite directions and adapted to engage with said internally threaded rings, means for securing said externally threaded rings together to rotate in unison and to move toward one another when one ring is rotated in one direction and away from one another when one ring is rotated in the opposite direction, a toggle one leg of which is attached to the annular frame and the other leg of which is attached to one of said externally threaded rings, a fluid actuated double acting piston and cylinder secured to said annular frame, and an actuating connection between said piston and said toggle whereby on actuation of the piston the externally threaded rings are moved relatively to the frame.

4. In a brake for a two-speed planetary gearing for superchargers, an annular frame having an inner ring portion provided with a plurality of circumferentially spaced holes extending axially therethrough, a pair of rings internally threaded in opposite directions and each having a plurality of unevenly spaced holes adapted to register some of the latter holes for each fractional relative rotation of the rings, said latter rings being insertable into said frame and said latter holes adapted for registry with the holes in said frame ring, anchoring means insertable through registering holes to secure the rings together on the frame, a pair of rings externally threaded in opposite directions and adapted to engage with said internally threaded rings, means for securing said externally threaded rings together to rotate in unison and to move toward one another when one ring is rotated in one direction and away from one another when one ring is rotated in the opposite direction, a pair of toggles at circumferentially spaced points one leg of each of which is attached to the said annular frame and the other leg of each of which is attached to one of the externally threaded rings, and means on the said annular frame for moving the toggles simultaneously to rotate the externally threaded rings relatively to the annular frame.

GERARD M. CUTLER.